(12) United States Patent
Gannelli et al.

(10) Patent No.: US 8,742,279 B2
(45) Date of Patent: Jun. 3, 2014

(54) METHOD OF CREATING AN AIRFOIL TRENCH AND A PLURALITY OF COOLING HOLES WITHIN THE TRENCH

(75) Inventors: Jesse Gannelli, Tolland, CT (US); Scott W. Gayman, Manchester, CT (US); Edward F. Pietraszkiewicz, Southington, CT (US); Christopher B. Jelks, East Hartford, CT (US); Sandra S. Pinero, Middletown, CT (US); Paul Thomas Rembish, Windsor, CT (US); Ryan Shepard Levy, Oak Park, IL (US)

(73) Assignee: United Technologies Corporation, Hartford, CT (US)

( * ) Notice: Subject to any disclaimer, the term of this patent is extended or adjusted under 35 U.S.C. 154(b) by 693 days.

(21) Appl. No.: 12/697,437

(22) Filed: Feb. 1, 2010

(65) Prior Publication Data

US 2011/0186550 A1 Aug. 4, 2011

(51) Int. Cl.
    *B23K 9/00* (2006.01)
(52) U.S. Cl.
    USPC ............................................. 219/69.1
(58) Field of Classification Search
    USPC ............................................. 219/69.1
    See application file for complete search history.

(56) References Cited

U.S. PATENT DOCUMENTS

| 3,594,536 | A | * | 7/1971 | Holroyd | 219/69.17 |
| 4,197,443 | A | | 4/1980 | Sidenstick | |
| 4,441,004 | A | * | 4/1984 | Inoue | 219/69.15 |
| 4,650,949 | A | * | 3/1987 | Field | 219/69.15 |
| 4,664,597 | A | | 5/1987 | Auxier et al. | |
| 4,684,323 | A | * | 8/1987 | Field | 416/97 R |
| 4,738,588 | A | | 4/1988 | Field | |
| 4,762,464 | A | * | 8/1988 | Vertz et al. | 416/97 R |
| 4,819,325 | A | * | 4/1989 | Cross et al. | 29/825 |
| 4,922,076 | A | * | 5/1990 | Cross et al. | 219/69.15 |
| 5,605,639 | A | * | 2/1997 | Banks et al. | 219/69.17 |
| 5,637,239 | A | * | 6/1997 | Adamski et al. | 219/69.15 |
| 5,690,473 | A | | 11/1997 | Kercher | |
| 5,779,437 | A | | 7/1998 | Abdel-Messeh et al. | |
| 6,164,912 | A | | 12/2000 | Tabbita et al. | |
| 6,183,199 | B1 | | 2/2001 | Beeck et al. | |
| 6,210,112 | B1 | | 4/2001 | Tabbita et al. | |
| 6,310,312 | B1 | * | 10/2001 | Higuerey et al. | 219/69.11 |
| 6,791,054 | B1 | * | 9/2004 | Mertz | 219/69.15 |
| 7,204,019 | B2 | * | 4/2007 | Ducotey et al. | 29/889.1 |
| 7,220,934 | B2 | * | 5/2007 | Paauwe et al. | 219/69.15 |
| 7,291,800 | B2 | * | 11/2007 | Varsell et al. | 219/69.15 |
| 7,300,252 | B2 | | 11/2007 | Liang | |
| 7,563,073 | B1 | * | 7/2009 | Liang | 416/97 R |

(Continued)

FOREIGN PATENT DOCUMENTS

EP 1013877 6/2000

OTHER PUBLICATIONS

European Search Report dated Mar. 20, 2012.

*Primary Examiner* — David E Graybill
(74) *Attorney, Agent, or Firm* — Carlson, Gaskey & Olds, P.C.

(57) ABSTRACT

A tool for forming a trench and a plurality of cooling holes within the trench includes a body, the body including a ridge portion extending along a first side of the tool. The ridge portion is operable to mate with a workpiece to form a trench on the workpiece. A plurality of electrodes extend from the ridge portion and are oriented to form a plurality of cooling holes within the trench on the workpiece.

16 Claims, 3 Drawing Sheets

(56) References Cited

U.S. PATENT DOCUMENTS

| | | | |
|---|---|---|---|
| 7,618,514 B2* | 11/2009 | Marszal et al. | 156/345.1 |
| 7,673,669 B2* | 3/2010 | Snyder et al. | 164/28 |
| 8,168,912 B1* | 5/2012 | Liang | 219/69.15 |
| 8,245,519 B1* | 8/2012 | Liang | 60/806 |
| 2006/0273073 A1* | 12/2006 | Paauwe et al. | 219/69.15 |
| 2007/0034524 A1 | 2/2007 | Riewe et al. | |
| 2007/0048135 A1* | 3/2007 | Pietraszkiewicz et al. | 416/97 R |
| 2007/0193979 A1* | 8/2007 | Varsell et al. | 219/69.15 |
| 2011/0186550 A1* | 8/2011 | Gannelli et al. | 219/69.1 |

* cited by examiner

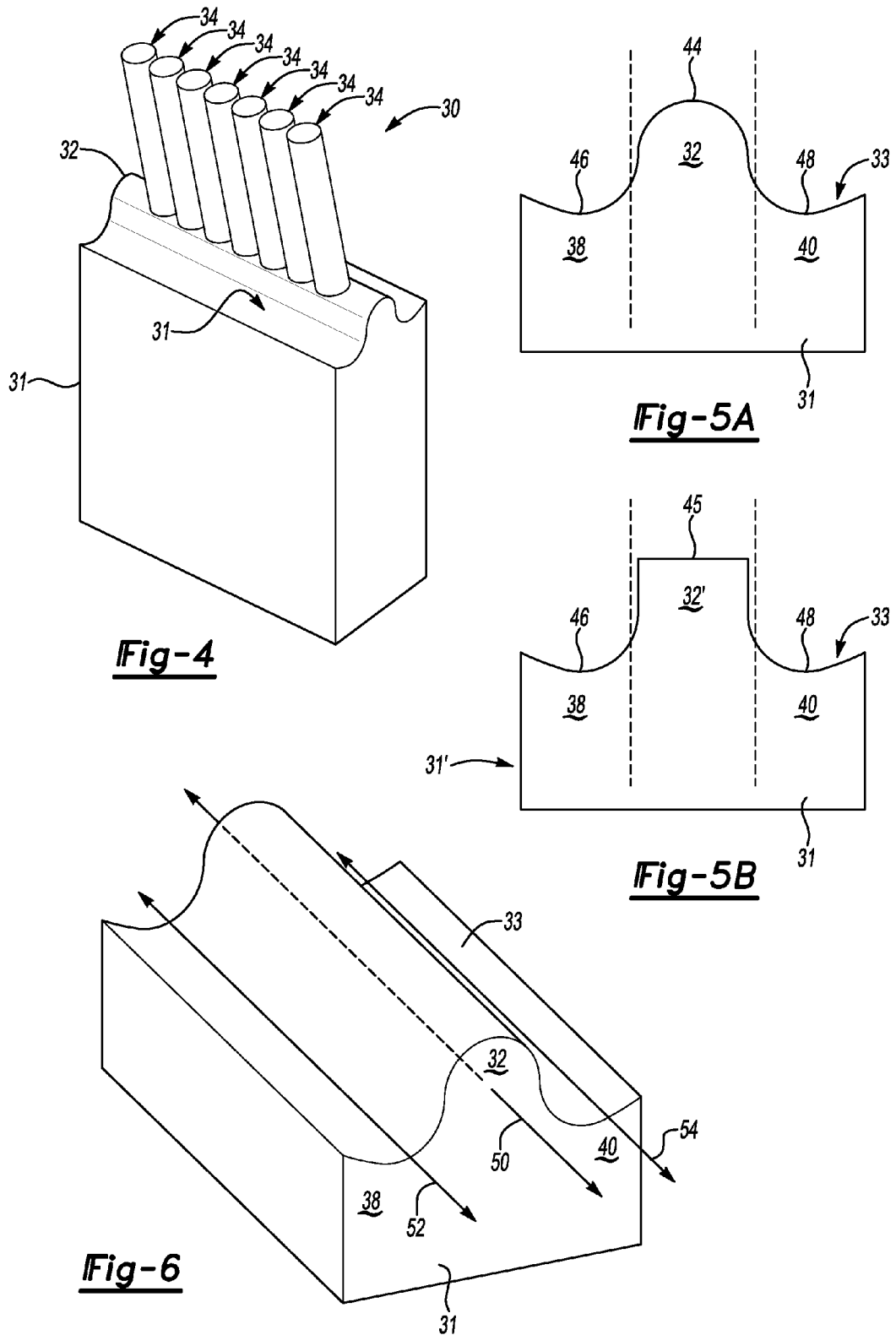

METHOD OF CREATING AN AIRFOIL TRENCH AND A PLURALITY OF COOLING HOLES WITHIN THE TRENCH

BACKGROUND OF THE INVENTION

This application relates to airfoil trenches, and more particularly to a method of creating an airfoil trench and a plurality of cooling holes within the trench.

Turbine blades in gas turbine engines can be subjected to very hot temperatures during engine operation, sometimes on the order of 2000° F. (1093° C.). Airfoil trenches have been used on turbine blades in gas turbine engines to cool the turbine blades. A trench may be formed along a leading edge of an airfoil portion of a turbine blade, and a number of cooling holes may be formed within the trench to create an air passage from the trench to a cavity within the turbine blade to reduce a leading edge temperature of the turbine blade during operation of the gas turbine engine.

In the prior art, a trench and corresponding cooling holes were created separately in separate processes using separate tools. These prior art techniques raised issues of inconsistent cooling hole placement within the trench due to manufacturing tolerances. For example, in some applications a cooling hole tolerance may permit no more than 0.02 inches-0.04 inches (0.05 cm-0.1 cm) of error.

SUMMARY

A tool for forming a trench and a plurality of cooling holes within the trench includes a body, the body including a ridge portion extending along a first side of the tool. The ridge portion is operable to mate with a workpiece to form a trench on the workpiece. A plurality of electrodes extend from the ridge portion and are oriented to form a plurality of cooling holes within the trench on the workpiece.

These and other features of the present invention can be best understood from the following specification and drawings, the following of which is a brief description.

BRIEF DESCRIPTION OF THE DRAWINGS

FIG. 4 illustrates another view of the tool of FIG. 3.

FIG. 5a illustrates a cross section of a body portion of the tool of FIG. 3.

FIG. 5b illustrates a cross section of the body portion of another embodiment of the tool of FIG. 3.

FIG. 6 illustrates the body portion of the tool of FIG. 3.

DETAILED DESCRIPTION

Figure 1:
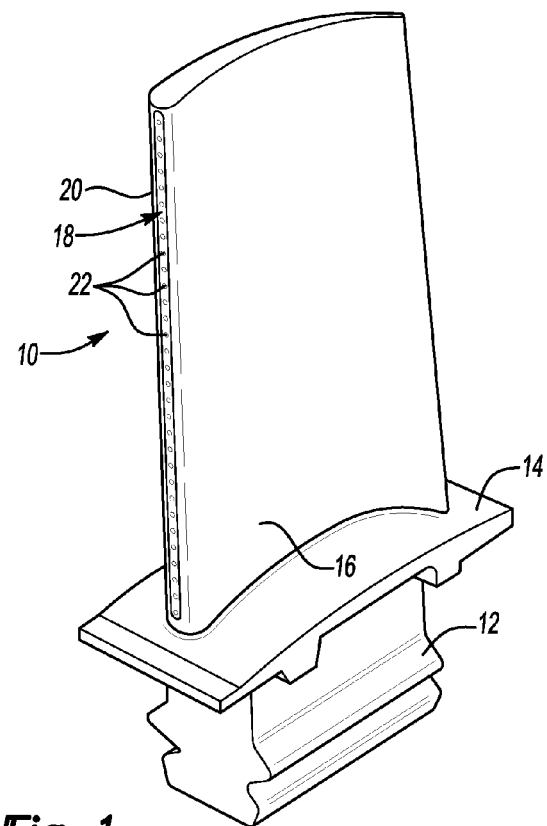
FIG. 1 illustrates a turbine blade of a gas turbine engine.
Figure 2:
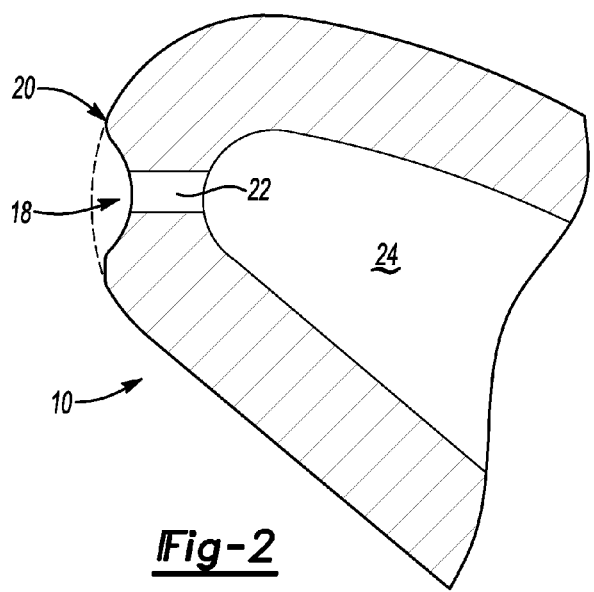
FIG. 2 illustrates another view of the turbine blade.

FIG. 1 illustrates a turbine blade 10 of a gas turbine engine. The turbine blade 10 includes a root portion 12, a platform 14, and an airfoil 16. A trench 18 is formed on a leading edge 20 of the airfoil 16. A plurality of cooling holes 22 extend from the trench 18 to a cavity 24 within the airfoil 16 (see FIG. 2).

The cooling holes 22 facilitate a flow of air from the cavity 24 to cool the airfoil 16. The cooling holes 22 may also be referred to as "film holes" because they create a passage from the cavity 24 of the airfoil 16 to an air film on an outside of the airfoil 16.

Figure 3:
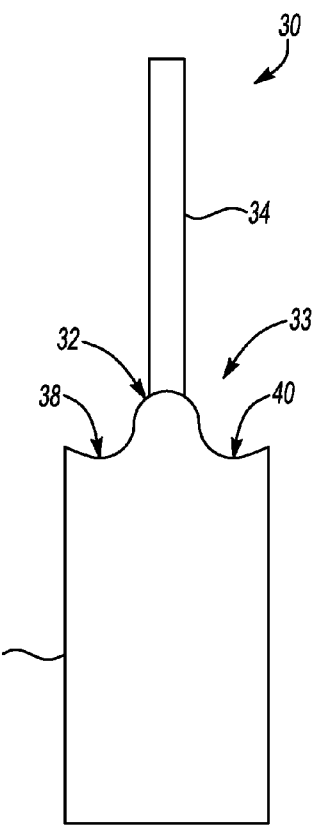
FIG. 3 illustrates tool for forming a trench and corresponding cooling holes on the turbine blade.

FIGS. 3 and 4 illustrate a tool 30 for forming the trench 18 and the cooling holes 22 within the trench 18. The tool 30 includes a body portion 31 and a plurality of electrodes 34. The body portion 31 includes a ridge portion 32, a first recessed portion 38, and a second recessed portion 40. The ridge portion 32 extends along a first side 33 of the body portion 31 of the tool 30. The plurality of electrodes 34 extend from the ridge portion 32.

In the Example of FIG. 5a, the ridge portion 32 has an arcuate cross section 44, the first recessed portion 38 has an arcuate cross section 46, and the second recessed portion 40 has an arcuate cross section 48. The recessed portions 38, 40 are located on opposite sides of the ridge portion 32. However, other configurations would be possible. For example, as shown in FIG. 5b, the ridge portion 32' may have a planar cross section 45.

Figure 7:
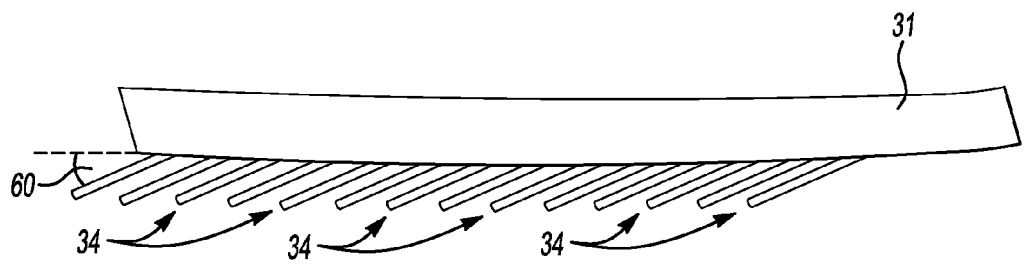
FIG. 7 illustrates another view of the tool of FIG. 3.

As shown in FIG. 6, the ridge portion 32 extends along an axis 50, the first recessed portion 38 extends along an axis 52, and the second recessed portion 40 extends along an axis 54. In one example the axes 52, 54 are parallel to the axis 50. Collectively, the ridge portion 32, recessed portions 38, 40 and the plurality of electrodes 34 define an integral comb. As shown in FIGS. 4 and 7, the plurality of electrodes 34 may be parallel to each other such that the plurality of cooling holes 22 are also parallel to each other. The plurality of electrodes 34 may extend from the body portion 31 at an angle 60 (see FIG. 7).

The ridge portion 32 and recessed portions 38, 40 are operable to mate with the airfoil 16 of the turbine blade 10 to form the trench 18, and the electrodes 34 are operable to form the plurality of cooling holes 22 in the trench 18. In one example the tool is applied after the turbine blade 10 has been formed, heat treated, and left to harden for several days. The ridge portion 32 and plurality of electrodes 34 are at least partially composed of an electrically conductive metal (e.g. copper) such that an electrical current may flow from the tool 30 to the airfoil 16 of the turbine blade 10 to remove material from the turbine blade 10 to form the trench 18 and cooling holes 22 in an electronic discharge machining ("EDM") process.

Figure 8A:
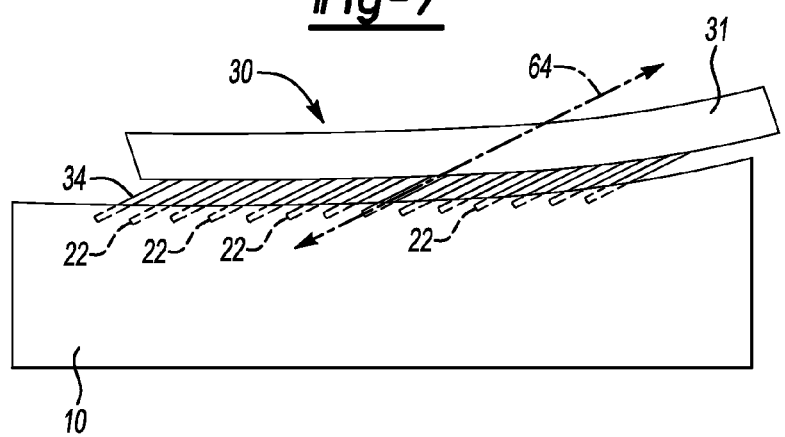
FIG. 8a illustrates the tool of FIG. 3 forming a trench and cooling holes in a workpiece.
Figure 8B:
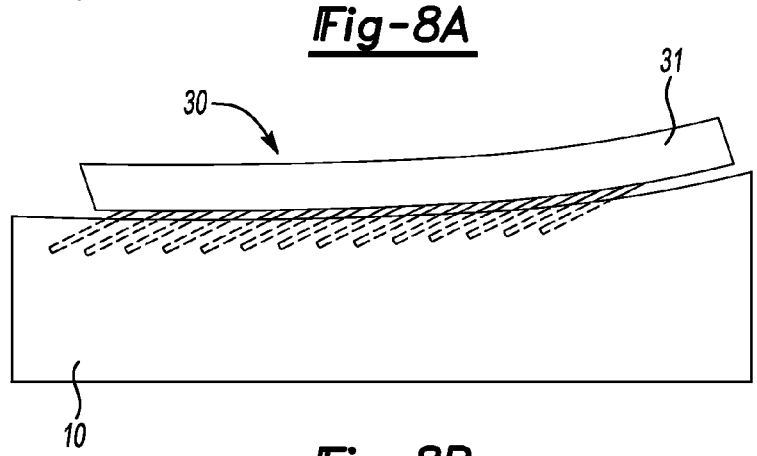
FIG. 8b illustrates another view of the tool of FIG. 3 forming the trench and cooling holes in the workpiece.
Figure 8C:
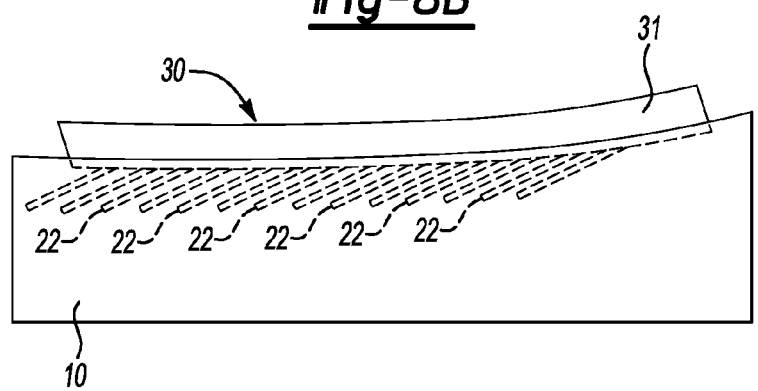
FIG. 8c illustrates another view of the tool of FIG. 3 forming the trench and cooling holes in the workpiece.

In an example EDM process, the tool is brought into close proximity to the turbine blade 10 such that an electric arc is formed between one or more of the electrodes 34 and the turbine blade 10. Once this arc is detected, a higher voltage may be applied to the tool to begin forming the cooling holes 22 in the airfoil portion 16 of the turbine blade. As shown in FIG. 8a, the tool 30 may be applied to the turbine blade 10 at the angle 60 along an axis 64 of one of the plurality of electrodes 34. In FIG. 8a, the tool 30 is shown with the electrodes forming an initial portion of the cooling holes 22. In FIG. 8b, the electrodes 34 of the tool 30 have been inserted further into the airfoil 10 such that an additional portion of the cooling holes 22 has been formed. In FIG. 8c, the electrodes 34 of the tool 30 have been completely inserted into the turbine blade 10 such that the cooling holes 22 and the trench 18 (see FIGS. 1, 2) have been formed in their entirety.

Unlike the prior art, the tool 30 is an integral comb such that a single tool 30 may be used to create both the trench 18 and the plurality of cooling holes 22. In one example the trench 18 and plurality of cooling holes 22 may be created in a single application of the tool 30. It is no longer necessarily to create a trench 18 with a first tool, and then to separately create the cooling holes 22 with a second tool, or conversely to create the cooling holes 22 with a first tool and then to create the trench 18 connecting the cooling holes 22 with a second tool. The tool 30 consistently creates cooling holes 22 at desired locations within the trench 18, reducing the cost of manufacturing a desired turbine blade and increasing reliability. By using the tool 30, issues of the trench 18 not being properly aligned with the cooling holes 22 can be reduced or completely eliminated.

Although the tool 30 has been described as forming a trench 18 and plurality of cooling holes 22 in a turbine blade, it is understood that the tool 30 could be used on other non-turbine blade workpieces. For example, the tool 30 could be used to form a trench 18 and cooling holes 22 in a turbine vane.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A tool for forming a trench and a plurality of cooling holes within the trench, comprising:
    a body comprising a ridge portion extending along an axis, the ridge portion extending along a first side of the tool and being operable to mate with a workpiece to form a trench on the workpiece, the body also comprising first and second recessed portions extending in the direction of the axis along, respectively, opposed lateral sides of the ridge with respect to the axis; and
    a plurality of electrodes extending from the ridge portion and being oriented to form a plurality of cooling holes within the trench on the workpiece, the electrodes being spaced apart along the direction of the axis.

2. The tool of claim 1, wherein the ridge portion and plurality of electrodes are at least partially composed of an electrically conductive metal such that an electrical current flows from the tool to the workpiece to remove material from the workpiece to form the trench and cooling holes in an electronic discharge machining process.

3. The tool of claim 1, wherein the workpiece is an airfoil portion of a turbine blade for a gas turbine engine or an airfoil portion of a turbine vane for a gas turbine engine.

4. The tool of claim 1, wherein the workpiece is a hollow airfoil having an inner cavity, wherein the trench is formed along a leading edge of the airfoil, and wherein the cooling holes define a plurality of passages from the trench to the inner cavity.

5. The tool of claim 1, wherein the plurality of electrodes are parallel to each other.

6. The tool of claim 1, wherein the ridge portion has an arcuate cross section, the first recessed portion has an arcuate cross section, and the second recessed portion has an arcuate cross section, each of the arcuate cross sections forming a continuous winding cross section of the body.

7. The tool of claim 1, wherein the ridge portion has a planar cross section, the first recessed portion has an arcuate cross section, and the second recessed portion has an arcuate cross section.

8. The tool of claim 1, wherein the ridge portion, the first recessed portion, the second recessed portion, and the plurality of electrodes collectively define an integral comb.

9. A method of forming an trench and a plurality of holes within the trench, comprising:
    applying a plurality of electrodes extending from a tool to an airfoil;
    passing an electric current from the plurality of electrodes to the airfoil to remove material from the airfoil to form a plurality of holes in the airfoil;
    applying a ridge portion of the tool to the airfoil, the ridge portion extending along an axis and along a first side of the tool, with first and second recessed portions extending in the direction of the axis along, respectively, opposed lateral sides of the ridge with respect to the axis, each of the plurality of electrodes extending from the ridge portion, the electrodes being spaced apart along the direction of the axis; and
    passing an electric current from the ridge portion to the airfoil to remove material from the airfoil to form a trench along the airfoil, such that each of the plurality of holes are within the trench, and such that a single tool is used to form both the trench and the plurality of holes.

10. The method of claim 9, wherein the plurality of electrodes and the ridge portion are applied to a leading edge of the airfoil.

11. The method of claim 9, wherein the workpiece is an airfoil portion of a turbine blade for a gas turbine engine.

12. The method of claim 9, wherein the workpiece is one of an airfoil portion of a turbine blade for a gas turbine engine or an airfoil portion of a turbine vane for a gas turbine engine.

13. The method of claim 9, wherein the airfoil is a turbine blade for a gas turbine engine, and wherein said steps of applying a plurality of electrodes extending from a tool to a leading edge of an airfoil, passing an electric current from the plurality of electrodes to the airfoil, applying a ridge portion of the tool to the leading edge of the airfoil, and passing an electric current from the ridge portion to the airfoil are selectively repeated for each of a plurality turbine blades extending radially from a rotor of the gas turbine engine.

14. The method of claim 9, wherein the workpiece is a hollow airfoil having an inner cavity, and wherein the trench is formed along a leading edge of the airfoil and the plurality of holes define a plurality of passages from the trench to the inner cavity.

15. The tool of claim 1, wherein the ridge portion and the first and second recessed portions are each elongated in the direction of the axis.

16. The tool of claim 1, wherein the ridge portion has a uniform cross-section along the direction of the axis.

* * * * *